United States Patent [19]

Kawai et al.

[11] Patent Number: 5,499,362
[45] Date of Patent: Mar. 12, 1996

[54] IMAGE PROCESSING APPARATUS

[75] Inventors: Tomoaki Kawai; Hiroyuki Yamamoto; Hiroshi Okazaki, all of Yokohama, Japan

[73] Assignee: Canon Kabushiki Kaisha, Tokyo, Japan

[21] Appl. No.: 473,971

[22] Filed: Jun. 7, 1995

Related U.S. Application Data

[63] Continuation of Ser. No. 826,866, Jan. 28, 1992, abandoned.

[30] Foreign Application Priority Data

Feb. 1, 1991 [JP] Japan .................................. 3-011968
Jan. 10, 1992 [JP] Japan .................................. 4-003003

[51] Int. Cl.⁶ .................................................. G06K 15/00
[52] U.S. Cl. .................................. 395/109; 358/534
[58] Field of Search .................................. 395/100, 101, 395/106, 109, 114, 115, 116; 358/452, 450, 455, 462, 518, 537, 534, 536

[56] References Cited

U.S. PATENT DOCUMENTS

| | | | |
|---|---|---|---|
| 4,468,692 | 8/1984 | Yamada et al. | 358/80 |
| 4,573,071 | 2/1986 | Sakamoto | 358/80 |
| 4,668,995 | 5/1987 | Chen et al. | 358/450 |
| 4,954,889 | 9/1990 | Endo et al. | 358/80 |
| 4,974,171 | 11/1990 | Yeh et al. | 395/109 |
| 5,117,484 | 5/1992 | Nakagawa | 395/100 |
| 5,125,072 | 6/1992 | Ng | 395/116 |

FOREIGN PATENT DOCUMENTS

| | | | |
|---|---|---|---|
| 0130287 | 1/1985 | European Pat. Off. | 395/109 |
| 0221666 | 5/1987 | European Pat. Off. | 395/109 |

*Primary Examiner*—Arthur G. Evans
*Attorney, Agent, or Firm*—Fitzpatrick, Cella, Harper & Scinto

[57] ABSTRACT

In an image processing apparatus, when a hard copy of image data displayed on a display with reduced gradation and non-image data displayed on the display is simultaneously produced, the image data are automatically printed as data having original high gradation while being synthesized with the non-image data. When a hard copy of image data and non-image data displayed on a bit-map display having low gradation is produced, the image data having high gradation is printed by a full-color printer by reading original-image data having the high gradation from a hard disk and synthesizing the read data with the non-image data in an image memory by a printer control unit according to image control information stored in an image control table.

6 Claims, 8 Drawing Sheets

FIG. 6

| ENTRY NO. | WINDOW ID | POSITION | SIZE | FILE NAME OF ORIGINAL IMAGE | NUMBER OF GRADATIONS |
|---|---|---|---|---|---|
| 1 | 1001 | (x1,y1) | w1 × h1 | image 1 | (8,8,8) |
| 2 | 1002 | (x2,y2) | w2 × h2 | image 2 | (8,8,8) |
| 3 | 1004 | (x3,y3) | w3 × h3 | image 3 | (8,0,0) |

IMAGE PROCESSING APPARATUS

This application is a continuation of application Ser. No. 07/826,866, filed Jan. 28, 1992, now abandoned.

BACKGROUND OF THE INVENTION

1. Field of the Invention

This invention relates to an image processing apparatus, and more particularly, to an image processing apparatus which includes a printer unit capable of providing, for example, a full-color output.

2. Description of the Prior Art

Heretofore, when a hard copy of the picture surface of an engineering work station (hereinafter termed an EWS) is output from a printer, the display color of the printer has been limited by the number of display gradations (the number of planes) on a bit-map display (hereinafter termed a display device) of the EWS.

A case will now be considered wherein the printer has a full-color (8 bits for each of R (red), G (green) and B (blue) signals) output function, and the number of display gradations of the display device is 8 bits (256 gradations). The EWS usually includes a multiwindow system, and various kinds of applications are simultaneously displayed in the form of a plurality of windows on the picture surface. In such an EWS, even if an application logically has a function of displaying a full-color image, it is impossible to display an image with the original number of gradations due to a limitation of the hardware of the EWS display device. Hence, the image is displayed as a window on the display device after performing depth reduction of the original image so that the number of gradations is equal to or less than 286 using a depth reduction method, such as a dither method or the like. If a hard copy of the picture surface is subsequently output from the printer, the portion of the window which must have originally been subjected to full-color display is a bit-compressed output.

If it is desired to print an image with an original number of gradations, that is, as a full-color image, the full-color image must be printed separately from the hard copy of the picture surface. Alternatively, the image must be output with the number of gradations of the EWS in the form of the hard copy of the picture surface together with applications other than the image displayed on the display device.

In the above-described conventional approach, however, in order to obtain a hard copy of an image with an original number of gradations of the image while preserving both the window of the image displayed in a compressed form and windows of applications other than the full-color image, it is necessary to temporarily receive hard-copy data of the picture surface and data of the full-color image in buffer regions and explicitly synthesize these data. This is a complicated operation for the operator.

SUMMARY OF THE INVENTION

The present invention has been made in cosideration of the above-described problem in the conventional approach.

It is an object of the present invention to provide an image processing apparatus and method which can receive an original image represented by fine gradations, synthesize the image with other images represented by coarse gradations, and output the synthesized image, This object is accomplished, according to one aspect of the present invention, by an image processing apparatus comprising a printer unit capable of outputting image data on a recording medium with high gradation in colors, and a display unit capable of outputting image data with gradation lower than the printer unit in colors. The apparatus further comprising display means for simultaneously displaying image data having a high gradation and non-image data having a gradation lower than the gradation of the image data on the display unit, storage means for storing the image data while maintaining the high gradation, display control means for controlling respective display operations of the image data and the non-image data, and print control means. The print control means reads the image data from the storage means, replaces the portion of the displayed image data by the image data having the original high gradation, synthesizes the replaced data with the non-image data, and prints synthesized data, when the image data and the non-image data displayed by the display means are simultaneously printed by the printer unit.

According to another aspect, the present invention relates to an image processing apparatus which operates so that when image data displayed on a display unit with reduced gradation are printed by a printer unit, the apparatus reads image data having high gradation from storage means, replaces the displayed image data with reduced gradation by the read image data, and simultaneously prints the replaced data together with non-image data displayed on the display unit.

According to still another aspect of the present invention, in an image processing apparatus comprising a printer unit capable of outputting image data on a recording medium with high gradation in colors, and a display unit capable of outputting image data with gradation lower than the gradation of the printer unit in colors, an image processing method comprises the steps of simultaneously displaying the image data having high gradation and other data having gradation lower than the gradation of the image data on the display unit, storing the image data while maintaining the high gradation, and controlling printing so as to read the stored image data, replace the portion of the displayed image data by the image data having the original high gradation, synthesize the replaced data with the other data, and print synthesized data, when the displayed image data and other data are simultaneously printed by the printer unit.

BRIEF DESCRIPTION OF THE DRAWINGS

FIG. 6 is a diagram showing the structure of an image control table;

DETAILED DESCRIPTION OF THE PREFERRED EMBODIMENT

The preferred embodiment of the present invention will now be explained in detail with reference to the accompanying drawings.

Figure 1:
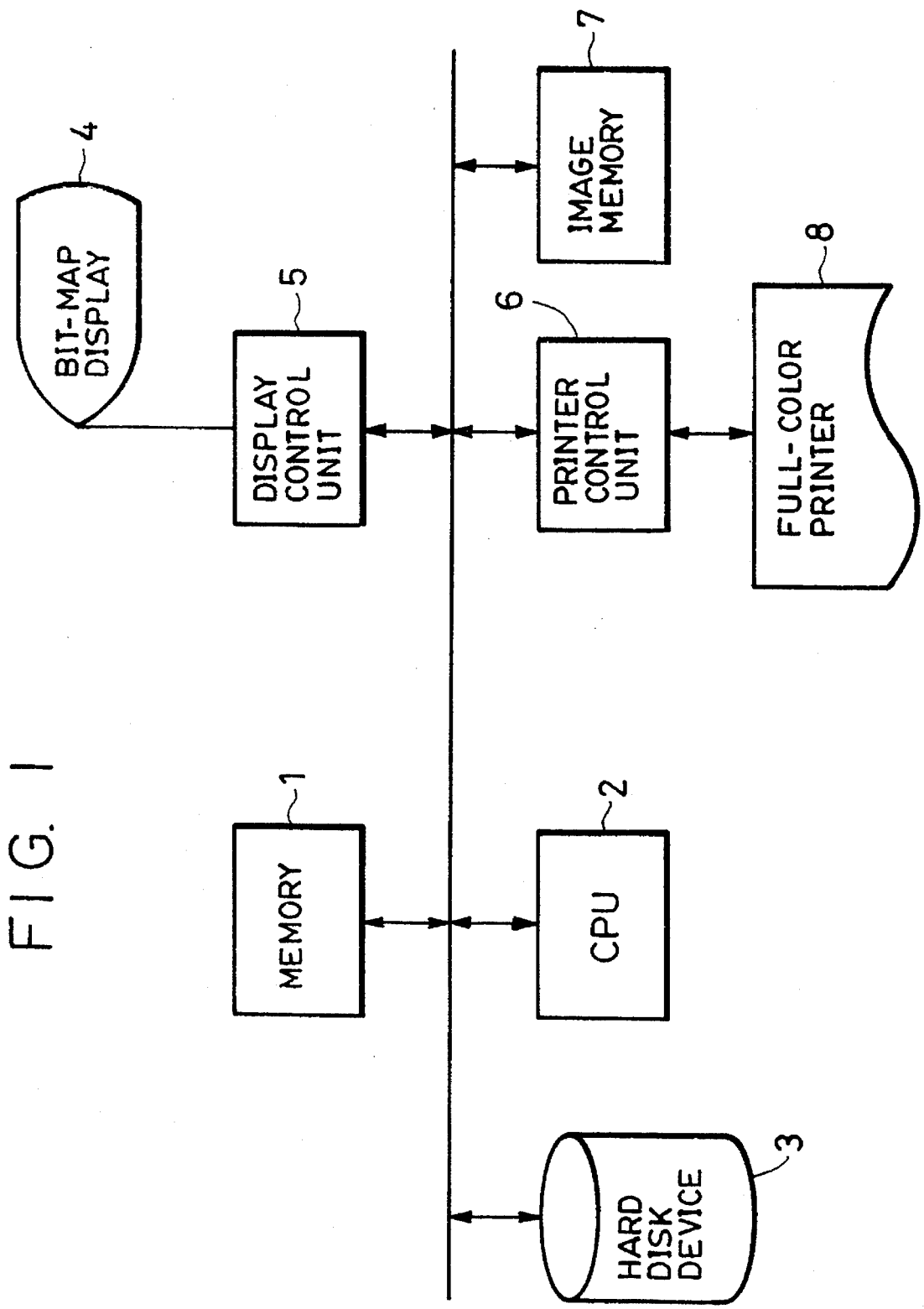
FIG. 1 is a block diagram showing the configuration of an image processing apparatus according to the preferred embodiment of the present invention.

FIG. 1 is a block diagram showing the configuration of an image processing apparatus according to the preferred embodiment of the present invention. In FIG. 1, a main storage unit (memory) 1 stores user programs, control programs and window programs for processing shown in FIGS. 2–5, and other data. A central processing unit (hereinafter termed a CPU) 2 executes processes stored in the storage unit 1, and processes data of the main storage unit 1 or other units. A hard disk device 3, serving as an external storage unit, stores processing programs and other data (image data and data other than the image data). A bit-map display 4 displays the image data and the data other than the image data. A display control unit 5 includes a bit-map memory, and displays the contents of the bit-map memory on the bit-map display 4. A printer control unit 6 controls printing of the image data and the other data by a full-color printer 8. An image memory 7 holds images to be printed by the full-color printer 8.

Figure 2:
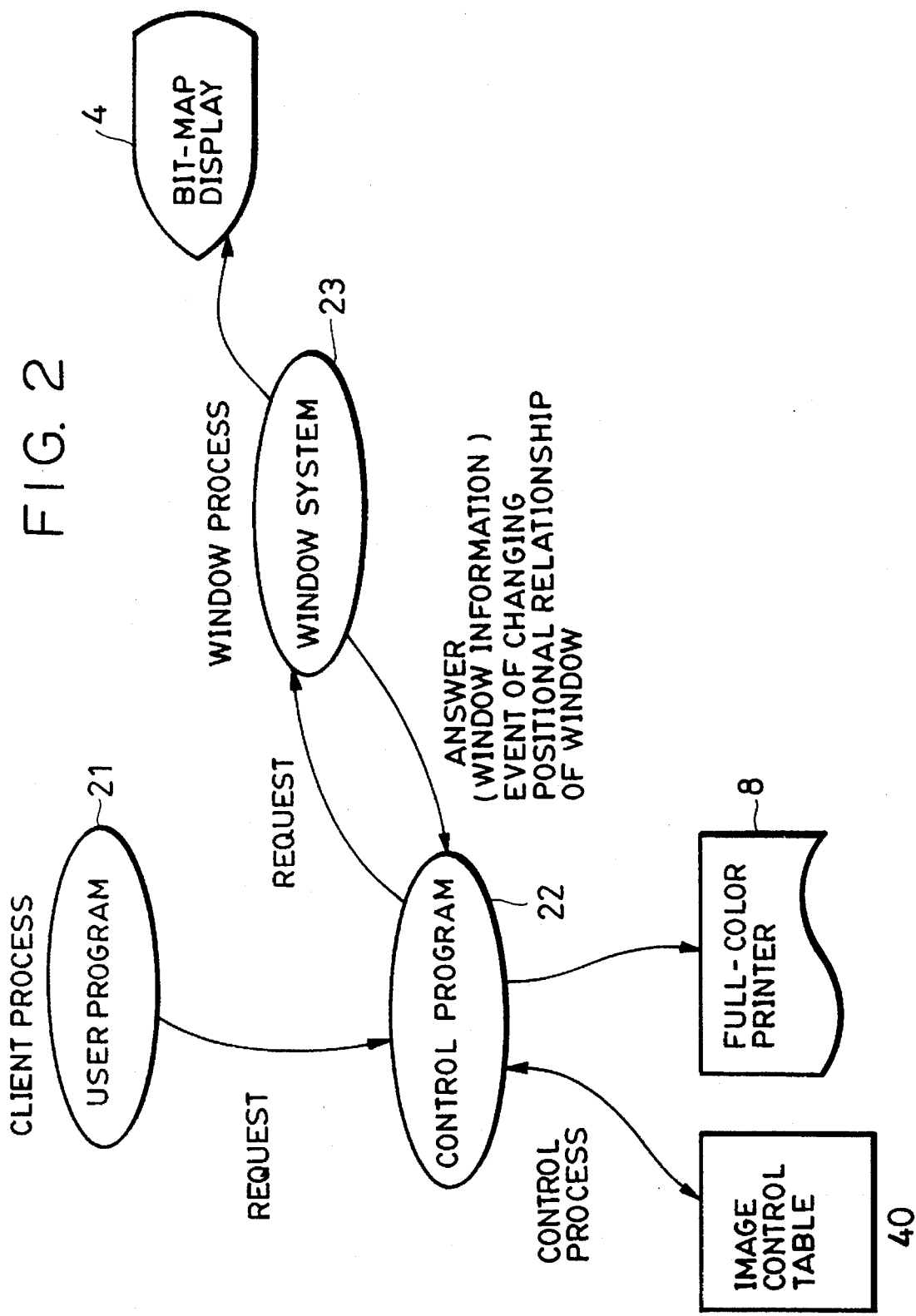
FIG. 2 is a diagram showing the relationship among respective processes of image control.

FIG. 2 shows the relationship among processes to be executed by the image processing apparatus of the present embodiment. As shown in FIG. 2, the CPU 2 executes a client process 21 to start a control program and output requests of image display and printing, a process 22 to perform image display control, and a window process 23 for displaying multiple windows on the bit-map display (hereinafter termed the display device) 4. When outputting an image to the full-color printer (hereinafter termed the printer) 8, data are transferred to the image memory 7 for storing images to be printed, a request of printing is then issued to the printer control unit 6, and the stored image data are output. When displaying an image on the display device 4, a request of display is issued in the window process 23 to perform display. For the window process used in the present embodiment, a window system realized in the form of processes, such as the X window system developed by the Massachusetts Institute of Technology, is considered. However, a window system incorporated in an operating system may also be used.

Figure 4:
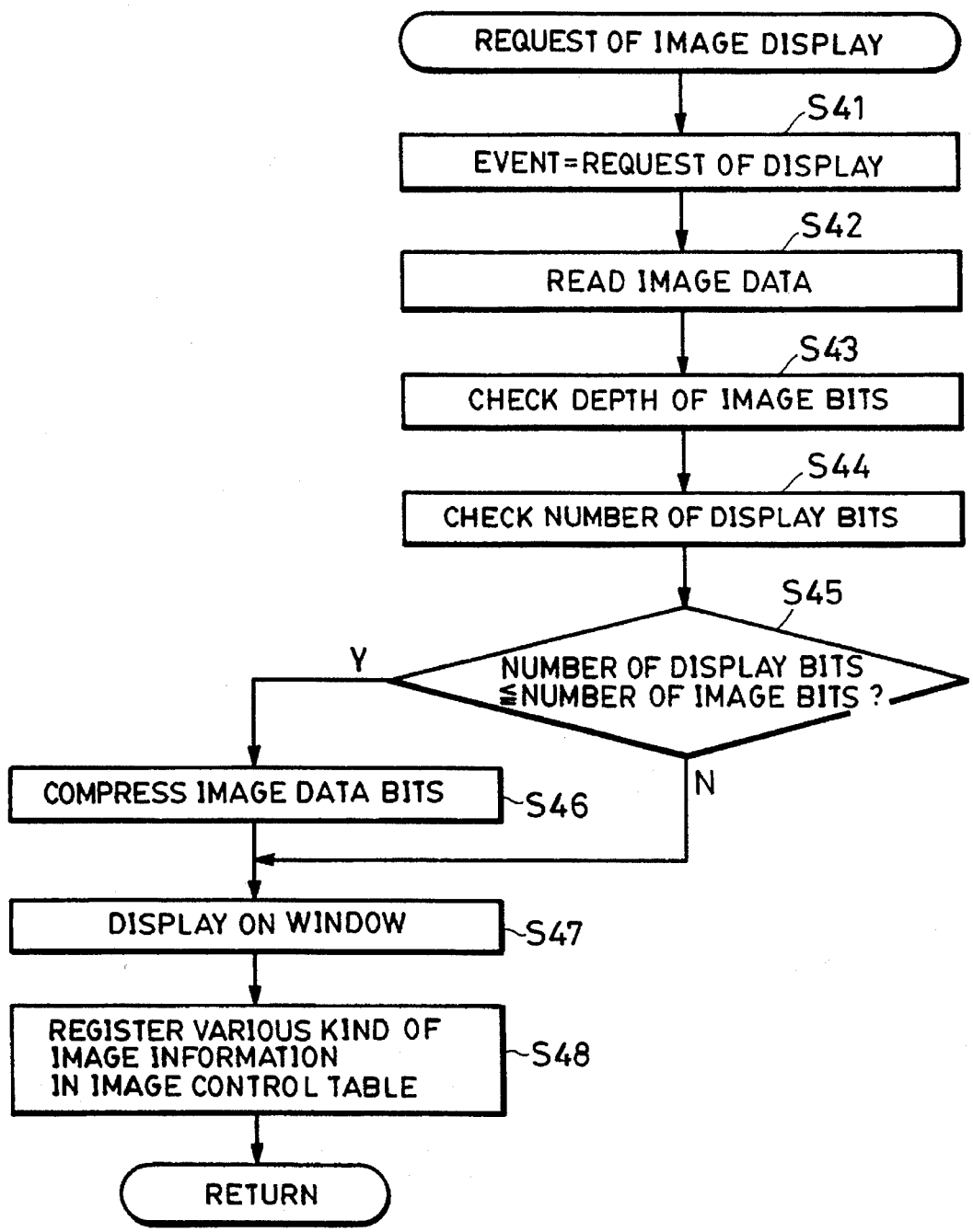
FIG. 4 is a flowchart showing image display request processing.
Figure 5:
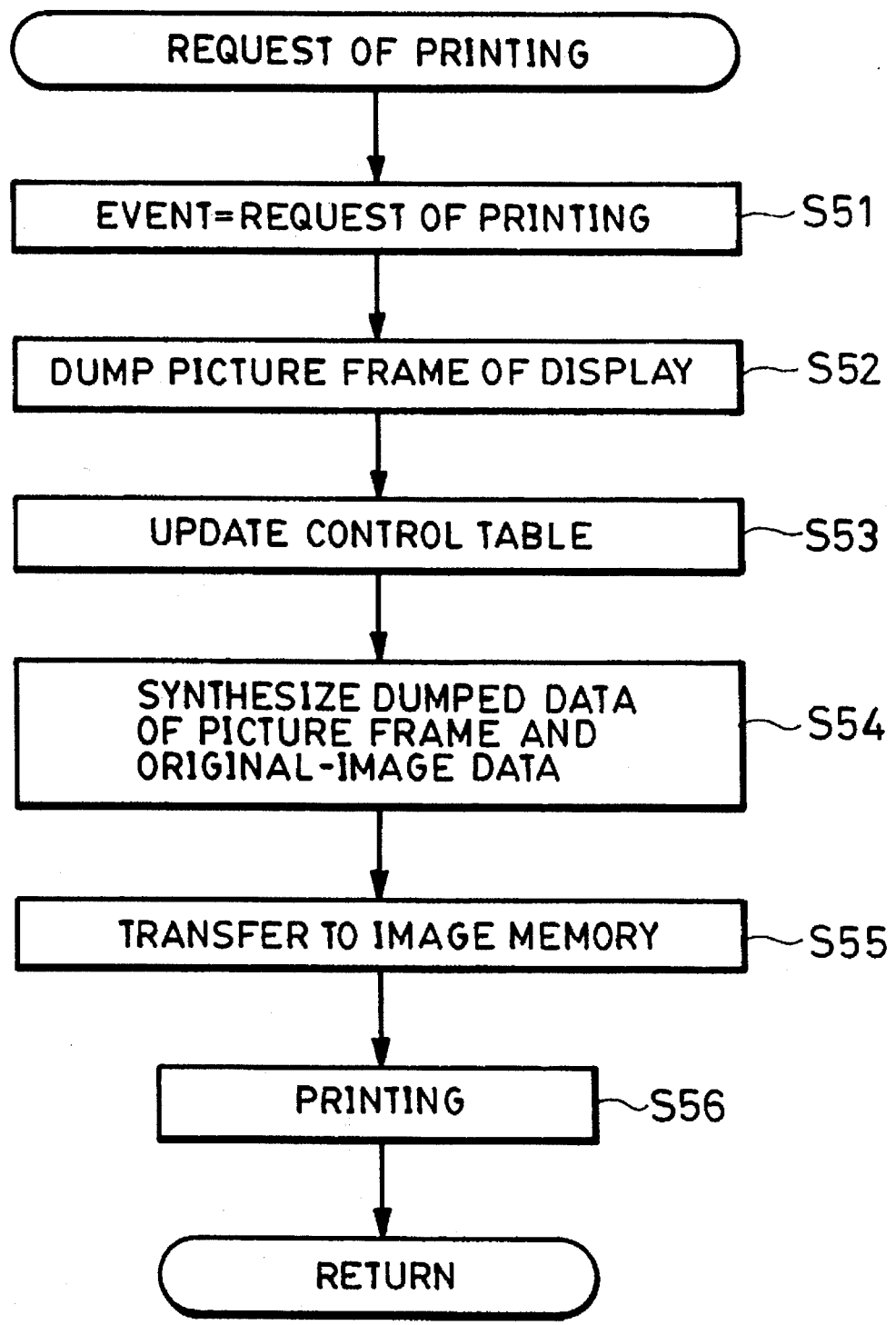
FIG. 5 is a flowchart showing print request processing.

The operation of image control processes in the present embodiment will now be explained with reference to flowcharts shown in FIGS. 3–5.

Figure 3:
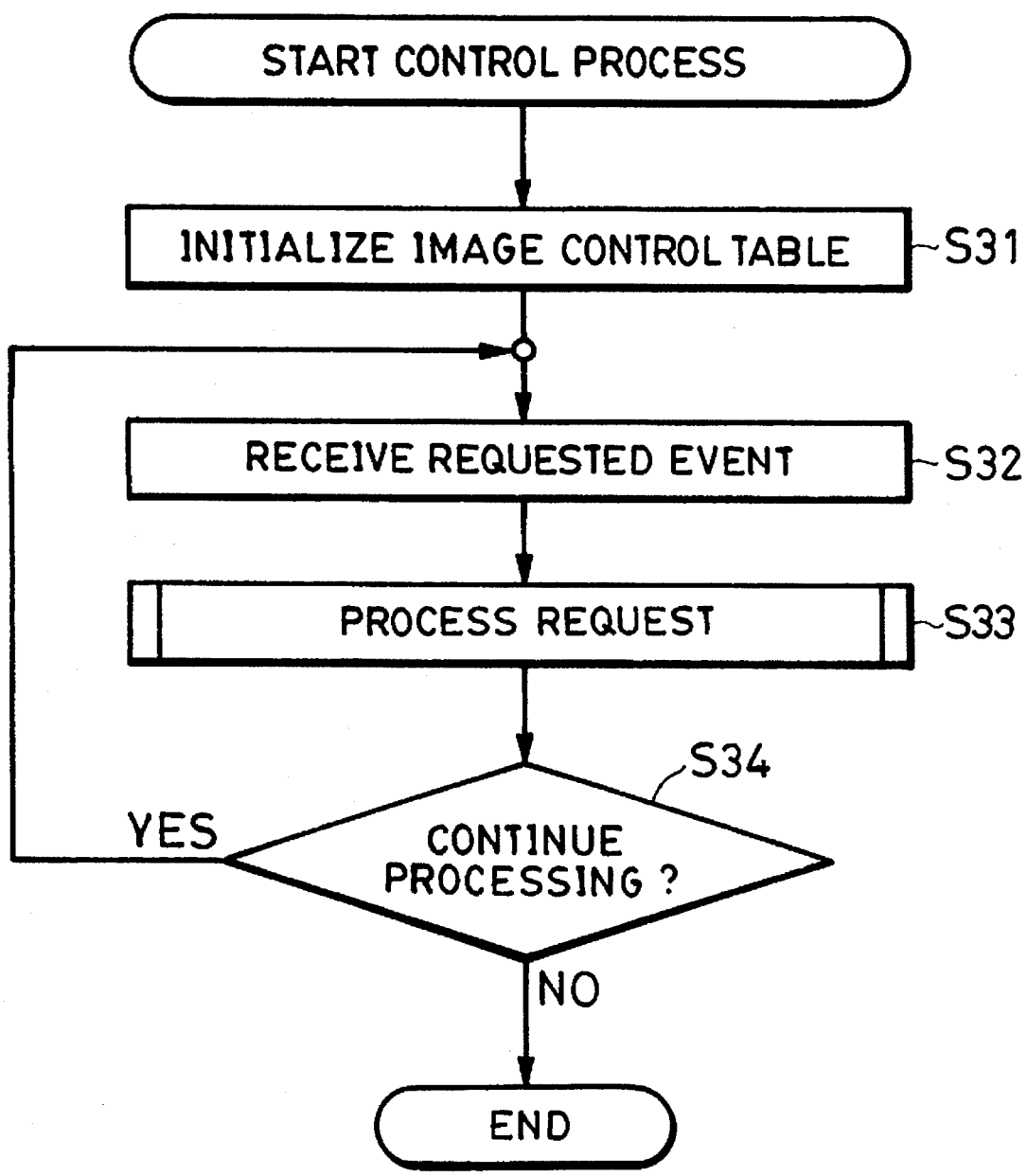
FIG. 3 is a flowchart showing an outline of image control processes.

Referring to FIG. 3, when the image control process 22 has been started by the CPU 2, first, in step S31, an image control table 40 formed in the main storage unit 1, shown in FIG. 6, is initialized. Each set of entries of the image control table 40 comprises an entry number 41, a window identifier 42, coordinates 43 of a start point of display on the display device 4, the size 44 of a window, the file name 45 of an original image, and the number 46 of gradations. Subsequently, in step S32, a request issued from the client process 21 is received. In step S33, processing is performed in accordance with the kind of the received request. In step S34, the CPU 2 determines whether processing of the control process 22 is to be continued as in a state of waiting for a requested event, or the control process 22 is to be terminated. In the case of continuing processing, the process returns again to step S32, where a requested event is awaited. In the case of terminating the control process, processing is terminated. Although, in the present embodiment, a request of display and a request of printing are provided as the kinds of requests, any other requests may be provided.

Next, a case will be considered wherein the request issued in the client process 21 is a request of image display for the display device 4. It is assumed that the request of display assigns the file name of image data and a start point of display. In such a case, the detail of request processing to be executed in step S33 is shown in FIG. 4.

Figure 8:
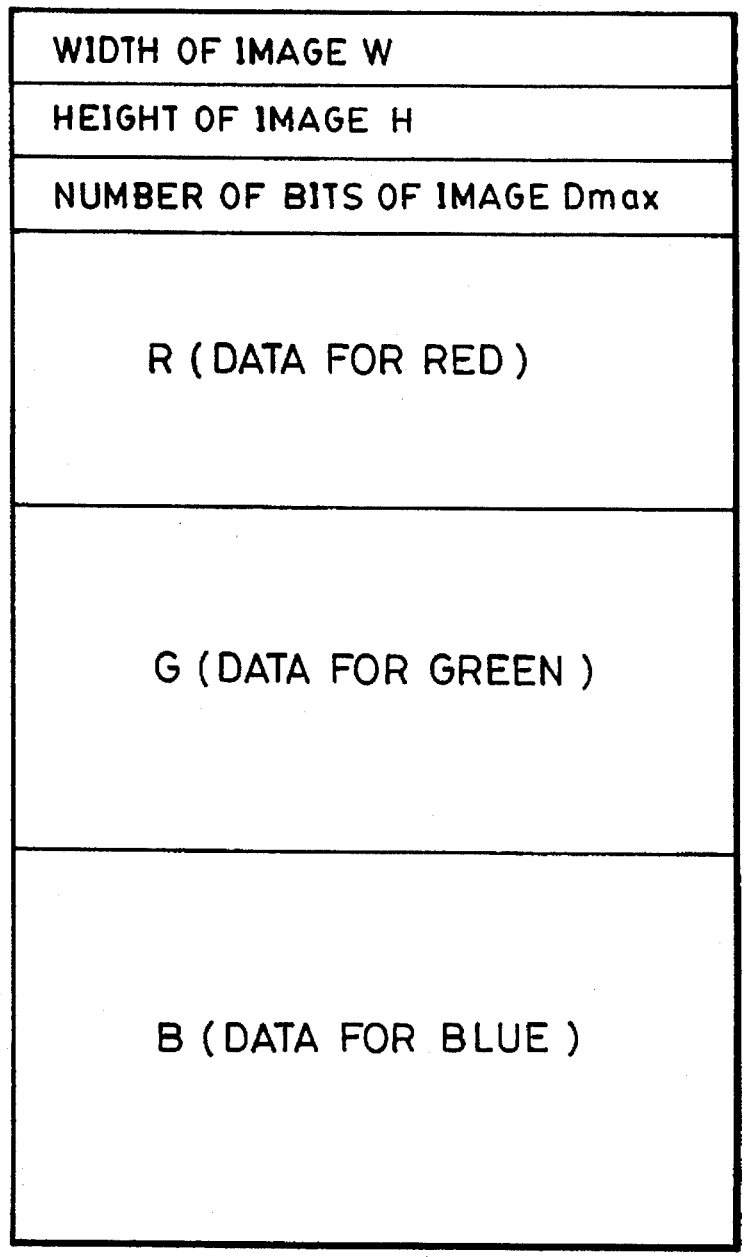
FIG. 8 is a diagram showing an image-file format.

First, in step S41, the CPU 2 confirms that the requested event is a request of display, and the process proceeds to step S42, where original-image data are read from the hard disk device 3 according to the file name of image data contained in the request of display. It is assumed that the original-image data are stored in the hard disk device 3, for example, in the form of a format shown in FIG. 8. In step S43, the depth (= n, the number of gradations of the image being the n-th power of 2) of image bits read from the data file is checked. In step S44, the number of display bits is checked. The maximum number of display bits equals the number ($D_{max}$) of bits corresponding to the maximum number of colors which can be displayed in the window system. In general, however, a plurality of images are displayed, or other applications are running on the same picture surface. Hence, color resources (a color map) having $D_{max}$ bits are not allocated only to display of one image. Accordingly, if the number of bits to be actually displayed is represented by d, the relationship $d \leq D_{max}$ holds. The maximum number $D_{max}$ can be obtained by asking the window process 23 shown in FIG. 2. The number d of bits to be actually displayed may be obtained by asking the control process 22 shown in FIG. 2. A well-known method may be used for a control mechanism of the control process 22 needed for controlling the number d of bits. In step S45, the number of display bits is compared with the number of bits of the original-image data. If the number of bits of the image data is equal to or greater than the number of display bits, the image data are compressed in step S46.

For example, if it is assumed that the original-image data comprise 8 bits for R, G and B signals, respectively, and the number of gradations of the bit-map display is 256 (8 bits), the image is compressed into 64 gradations (6 bits), 128 gradations (7 bits), or the like. A color dither method, a Peano mapping method and the like are known as depth reduction methods. In the present embodiment, depth reduction is performed using a well-known method, and an explanation thereof will be omitted.

In step S47, a request of display using compressed image data is issued to the window process 23 to perform display on the display device 4. In the present embodiment, identifiers are provided to all windows according to the image control table 40 shown in FIG. 6 to perform control. Hence, when window diplay is performed, the window process 23 answers the corresponding window identifier to the control program. In step S48, the above-described window identifier, the file name of the image, and the number of gradations of the original image are registered in the image control table 40 shown in FIG. 6, and the process returns to step S33.

Figure 7:
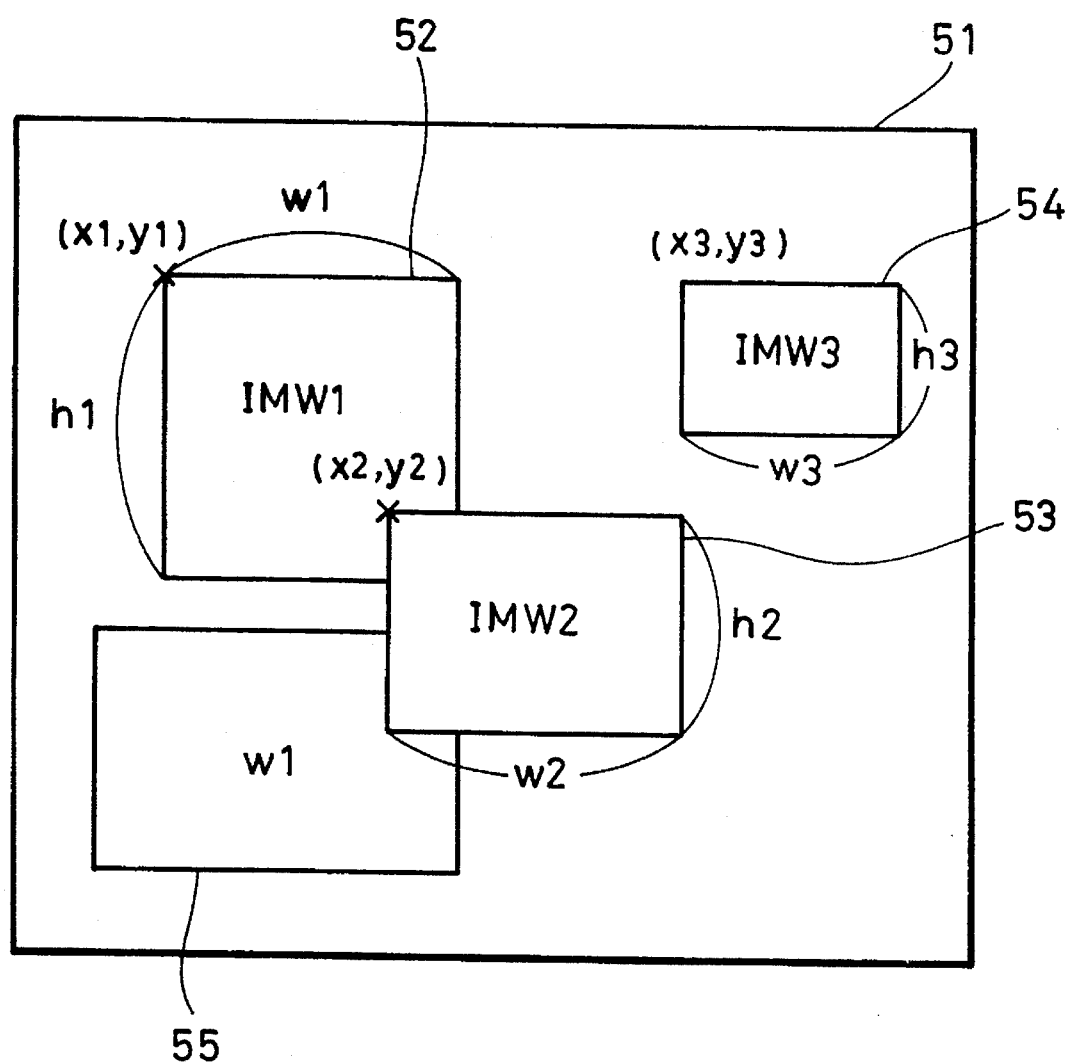
FIG. 7 is a diagram showing an example of display of the picture surface of image windows corresponding to information set in the image control table shown in FIG. 6.

FIG. 7 shows an example of the picture surface of the display device 4 which displays three corresponding image windows when three kinds of window information are set in the image control table 40, as shown in FIG. 6, according to the above-described processes.

In FIG. 7, image windows 52–54 corresponding to entry numbers 1–3 of the event request step 41 shown in FIG. 6 are displayed on a picture frame 51 of the bit-map display, respectively. The image windows 52–54 have start points (x1, y1), (x2, y2) and (x3, y3) of image display on the picture frame 51 of the bit-map display, and sizes (w1, h1), (w2, h2) and (w3, h3), respectively. The values of entry numbers 41 represent hierarchy among windows, that is, a window having a larger entry number has a higher hierarchy. Accordingly, when the image windows 52 and 53 overlap, part of the image window 52 having a smaller value is masked. If a display state of an image window is changed, an event is generated from the window process 23 to the control process 22. Hence, the value of the corresponding entry number 41 in the image control table 40 is rewritten. The rewriting operation is performed by the control process. In FIG. 7, a normal window 55 is displayed in addition to the image windows. Any number of image windows and normal windows may be present provided that the limit value for the window system is not exceeded.

Next, a case will be considered wherein the request issued in the client process 21 is a request of printing for the printer 8. In such a case, the detail of request processing to be executed in step S33 is shown in FIG. 5.

First, in step S51, the CPU 2 confirms that the requested event is a request of printing, and the process proceeds to step S52, where the picture frame of the display device 4 is dumped using a well-known hard copy method. Next, in step S53, window information is requested to the window process 23, and the image control table 40 is updated according to the obtained information. In step S54, image data of the file name 45 of the original image are read from the hard disk device 3 and written in an area defined by the coordinates 43 of the start point of display and the window size 44 corresponding to the window identifier 42 within the image control table 40 corresponding to dumped data of the image, and are directly synthesized with the dumped data of the image as noncompressed image data in a predetermined area of the main storage unit 1. At that time, the dumped data of tile image are expanded and converted so as to comprise 8 bits for respective R, G and B signals.

In step S55, the synthesized image data are transferred to the image memory 7. In step S56, a request of printing is issued to the printer control unit 6 to perform printing by the printer 8.

As described above, according to the present embodiment, by providing processing for controlling a data file of an original image displayed on a bit-map display while being bit-compressed, the display position and size of an image window, the number of gradations of the original image, and the like, it is possible to simultaneously and automatically obtain a hard copy of the original image with a number of gradations of the original image while simultaneously displaying the image window together with windows displaying applications other than the full-color image.

Although, in the present embodiment, original-image data are assumed to comprise 8 bits for respective R, G and B signals, any other number of bits and any other color system (a CMY (cyan, magenta and yellow) system or the like) may be adopted, and the original image may be a monochromatic image having gradations, such as a gray image.

Although, in the present embodiment, an explanation has been provided of a case wherein the image control program is constituted by processes, the image control program may, for example, be built in a window system or an operating system.

As explained above, according to the present invention, it is possible to receive an original image represented by fine gradations and synthesize the image with other images represented by coarse gradations. Hence, the present invention has the effect of releasing the operator from a complicated operation.

What is claimed is:

1. An image processing apparatus, comprising:

storage means for storing image data;

display means for displaying the image data;

judging means for judging whether the image data stored in said storage means is first image data having a first gradation higher than a gradation with which said display means is capable of displaying or second image data having a second gradation lower than the gradation with which said display means is capable of displaying; and display control means for compressing the gradation of the image data and displaying the compressed image data when the image data are judged to be the first image data by said judgement means, and displaying the image data when said image data are judged to be the second image data by said judgment means.

2. An image processing apparatus according to claim 1, wherein said display means includes means for displaying image data having a number of gradations exceeding a maximum number of gradations which said display unit can display while reducing the number of gradations of the image data to a number of gradations smaller than the maximum number of gradations according to information of colors used by an already-displayed image, when said image data are displayed.

3. An image processing apparatus comprising:

display means for displaying image data;

storage means for storing image data;

display control means for compressing the gradation of the image data and displaying the compressed image data having a first gradation higher than a gradation of image data with which said display means is capable of displaying; and print control means for controlling the image data so as to replace the compressed image data being displayed with the image data stored in said storage means, synthesize the replaced data with image data displayed without being compressed by said display control means, and print the synthesized data, when the compressed image data being displayed and the image data displayed without being compressed by said display control means are simultaneously printed.

4. An image processing apparatus according to claim 3, wherein said display means includes means for displaying image data having a number of gradations exceeding a maximum number of gradations which said display unit can display while reducing the number of gradations of the image data to a number of gradations smaller than the maximum number of gradations according to information of colors used by an already-displayed image.

5. An image processing method comprising the steps of:

storing image data in a memory;

displaying the image data on a display;

judging whether the image data stored in the memory is first image data having a first gradation higher than a gradation with which the display is capable of displaying or second image data having a second gradation lower than the gradation with which the display is capable of displaying; and controlling the display so as to compress the gradation of the image data and display the compressed image data stored in the memory when the image data are judged to be the first image data and displaying the image data stored in the memory when the image data are judged to be the second image data.

6. An image processing method comprising the steps of:

displaying image data on a display;

storing image data in a memory;

controlling the display so as to compress the gradation of the image data and display the compressed image data having a first gradation higher than a gradation of the image data with which the display is capable of displaying; and controlling printing of the image data so as to replace compressed image data being displayed with the image data stored in the memory, synthesize the replaced data with image data displayed without being compressed, and print the synthesized data, when simultaneous printing of the compressed image data being displayed and the image data displayed without being compressed is instructed.

* * * * *

UNITED STATES PATENT AND TRADEMARK OFFICE
CERTIFICATE OF CORRECTION

PATENT NO. : 5,499,362
DATED : March 12, 1996
INVENTOR(S) : Kawai et al.

It is certified that error appears in the above-indentified patent and that said Letters Patent is hereby corrected as shown below:

COLUMN 1:

Line 35, "286" should read --256--.

Signed and Sealed this

Sixth Day of August, 1996

Attest:

BRUCE LEHMAN

*Attesting Officer*     *Commissioner of Patents and Trademarks*